United States Patent
Biteau et al.

(10) Patent No.: US 8,062,542 B2
(45) Date of Patent: Nov. 22, 2011

(54) LIGHT-POLARIZING SOLID COATING COMPOSITION, OPTICAL LENS COMPRISING SAME, AND METHOD FOR MAKING SAME

(75) Inventors: John Biteau, Treasure Island, FL (US); Myriam Fanayar, Nantes (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 1090 days.

(21) Appl. No.: 11/576,670

(22) PCT Filed: Sep. 30, 2005

(86) PCT No.: PCT/FR2005/050800
§ 371 (c)(1),
(2), (4) Date: Sep. 27, 2007

(87) PCT Pub. No.: WO2006/037916
PCT Pub. Date: Apr. 13, 2006

(65) Prior Publication Data
US 2008/0111098 A1    May 15, 2008

(30) Foreign Application Priority Data
Oct. 4, 2004   (FR) ..................... 04 52248

(51) Int. Cl.
*C01G 49/00* (2006.01)
*C09D 5/23* (2006.01)
*G02B 1/08* (2006.01)
*G02B 1/10* (2006.01)
*G02C 7/02* (2006.01)
*G02C 7/12* (2006.01)

(52) U.S. Cl. ............... 252/62.56; 252/62.54; 252/62.61; 252/62.62; 427/162; 427/163.1; 351/159; 351/163

(58) Field of Classification Search .................... 428/1.1, 428/1.31; 252/299.01, 299.1, 299.5, 62.54, 252/62.56, 62.61, 62.62; 427/162, 163.1; 351/159, 163
See application file for complete search history.

(56) References Cited

U.S. PATENT DOCUMENTS

| | | | |
|---|---|---|---|
| 1,873,951 A | 8/1932 | Zocher | 359/491 |
| 3,927,930 A | 12/1975 | Goldberg et al. | 359/488 |
| 4,362,803 A * | 12/1982 | Miyakawa et al. | 430/122.51 |
| 5,671,211 A * | 9/1997 | Akashi et al. | 369/275.1 |
| 5,882,774 A | 3/1999 | Jonza et al. | 428/212 |
| 5,943,156 A | 8/1999 | Komuro et al. | 359/280 |
| 6,232,027 B1 * | 5/2001 | Matsunaga et al. | 430/108.3 |
| 6,245,399 B1 | 6/2001 | Sahouani et al. | 428/1.31 |
| 6,788,452 B2 * | 9/2004 | Liang et al. | 359/296 |
| 2010/0279125 A1 * | 11/2010 | Buyuktanir et al. | 428/432 |

FOREIGN PATENT DOCUMENTS
WO    WO 90/13052    11/1990

* cited by examiner

*Primary Examiner* — Shean Wu
(74) *Attorney, Agent, or Firm* — Fulbright & Jaworski L.L.P.

(57) ABSTRACT

The light-polarizing solid coating composition which comprises (i) particles of at least one magnetic material suspended in a solvent, is characterized in that it comprises (ii) at least one dichroic dye compound.
Application to ophthalmic optics.

27 Claims, 3 Drawing Sheets

Figure 1A parallel

Figure 1B perpendicular

Figure 2 A parallel

Figure 2B perpendicular

LIGHT-POLARIZING SOLID COATING COMPOSITION, OPTICAL LENS COMPRISING SAME, AND METHOD FOR MAKING SAME

This application is a national phase application under 35 U.S.C. §371 of International Application No. PCT/FR2005/050800 filed 30 Sep. 2005, which claims priority to French Application No. 0452248 filed 4 Oct. 2004. The entire text of each of the above-referenced disclosures is specifically incorporated herein by reference without disclaimer.

FIELD OF THE INVENTION

The present invention relates to the field of light-polarizing optical products, especially optical glasses such as for spectacle lenses, and more specifically to the development of light-polarizing solid coatings.

PREVIOUS ART

Generally speaking, the method for producing an optical glass having the property of polarizing light may either consist (i) in treating the glass mass (i.e. the substrate), for example by dispersing a silver halide into the melting mineral glass mass, or (ii) in coating at least one of the surfaces of the organic or mineral optical glass, with a light-polarizing coating layer.

Various types of solid coating layers are known in the previous art for optical glasses used for polarizing light.

Light-polarizing polymers have been used in particular for producing polarizing filters.

Light-polarizing polymers that have been used include amongst others, alkylene terephthalate polymers, such as polyethylene terephthalate (PET). Sometimes, the PET-based polarizing film also comprises a naphthalene dicarboxylic acid in a crystalline or a semi-crystalline form, such as a poly(ethylene naphthalate), or a copolymer derived from ethylene glycol, naphthalene dicarboxylic acid or other acids such as terephthalic acid, as described in the U.S. Pat. No. 5,882,774.

The preparation of light-polarizing solid coating layers has also been described, using ferromagnetic particles as light-polarizing component.

According to the U.S. Pat. No. 5,943,156, a monomer gel is prepared, comprising ferromagnetic material particles the surface of which is coated with a conductive film. The optical glass is then coated, on at least one of its surfaces with said monomer gel, and the whole is arranged in a magnetic field so as to align the ferromagnetic particles that have been made conductive. In a final step, the one or more monomer(s) contained in the gel is or are cured, so as to fix the alignments of conductive ferromagnetic particles in a polymeric mass. As starting monomer material, an alkoxylated derivative is used, such as tetraethoxysilane, methyl triethoxysilane, 3-aminopropyl triethoxysilane or trifluoropropyl trimethoxysilane, which is solution-hydrolyzed, by adding water, so as to form the gel. As used therein, said ferromagnetic material means solely chromium dioxide particles ($CrO_2$) in flake form that have been coated with a metallic conductive film such as gold, silver, copper, nickel or tin.

The PCT application n° WO 90/13052 also provides a description of how to produce polarizing films based on magnetic particles. According to the processing method described, said magnetic particles are added to a viscous medium comprising one or more polymer or pre-polymer materials. Thereafter, the viscous medium is applied onto a support, so as to form therewith a layer. A magnetic field is then applied to the whole, so as to align the magnetic particles, prior to performing a polymer or pre-polymer material curing step. Suitable polymer or pre-polymer materials include polyurethanes, acrylics and methacrylics, polyesters such as glycol-phthalate esters, Nylons®, polyolefines or, more generally thermoplastic or thermosetting resins, especially organic polymer resins. According to a particular embodiment, magnetic particles incorporated into plastic beads are used as magnetic particles, for example polystyrene beads, said plastic beads also comprising some black carbon or other pigments. It is also envisaged either to incorporate the magnetic material into pigments, or to coat magnetite particles with pigments or with opaque filler-containing materials.

There is a need in the state of the art for methods for producing polarizing optical glasses, that would be easier and shorter to carry out as compared to known methods, and that would be carried out with easy to produce and economic starting materials.

There is also a need in the state of the art for methods of this type that are easily feasible whatever the nature, mineral or organic, of the optical glasses, without any substantial adaptation.

There is a need for novel polarizing coating compositions as well, to be used in improved processing methods for making polarizing optical glasses.

DESCRIPTION OF THE INVENTION

According to the invention, a light-polarizing solid coating composition and a processing method of a polarizing optical glass using said composition as a starting material have been developed.

The applicant showed that, for making a solid coating for optical glass, light-polarizing properties are obtained when using as a starting material a suspension in a solvent, preferably an aqueous solvent, containing both particles of a magnetic material and one or more dichroic dyes, with or without any polymer lattice formed.

Surprisingly, we demonstrated according to the invention that in a liquid film resulting from an aqueous suspension of the hereinabove mentioned type, which is formed onto a transparent substrate, the whole being submitted to the action of a magnetic field, we could observe an alignment of both magnetic particles and dichroic dye(s). Once the liquid film had been dried, we could show the formation of a solid coating layer onto the transparent substrate with excellent light-polarizing properties.

Thus, surprisingly, when a film resulting from an aqueous suspension comprising magnetic particles and one or more dichroic dye(s) is formed onto the surface of a transparent substrate, then is submitted to the action of a magnetic field, the alignment of the magnetic particles also causes the alignment of the molecules of the one or more dye(s). Additionally, the alignment of these two types of compounds is conserved once the liquid film has been dried and thus does result in a solid coating layer onto the surface of the transparent substrate, said layer being provided with excellent light-polarizing properties.

This is particularly unexpected since the applicant did surprisingly observe that producing a liquid film resulting from a simple aqueous suspension comprising particles of a magnetic material, especially a ferrimagnetic material, on the surface of an optical substrate, then drying said film in a magnetic field leads to produce a coating layer with no light-polarizing properties.

Thus, we surprisingly noticed that particles of a magnetic material do not polarize the light when incorporated into a solid coating layer that does not contain any oriented matrix, especially any polymer lattice.

Therefore, it is an object of the present invention to provide a light-polarizing solid coating composition, comprising suspended in a solvent (i) particles of at least one magnetic material, (ii) at least one dichroic dye compound and optionally (iii) at least one surfactant.

Preferably, the solvent is water, more preferably deionized water.

As used herein, a magnetic material means a material having a magnetic moment that is preferably permanent, even with no external magnetic field.

Magnetic materials that can be used include ferromagnetic or ferrimagnetic materials.

In the context of the present invention, ferromagnetic or ferrimagnetic particles may be of any known type, such as ordinary used in the state of the art in light-polarizing systems.

Ferromagnetic materials are typically conductive metals or conductive metal alloys such as iron, cobalt, nickel, gadolinium, dysprosium, and various ferrites.

Ferrimagnetic materials are typically ceramics based on metal oxides, that are poorly conductive or insulating.

Particles of at least one magnetic material used in a composition according to the invention are preferably selected from the group consisting of $Fe_2O_3$ or a material of formula $MO.Fe_2O_3$, wherein M represents Zn, Cd, Fe, Ni, Cu, Co, Mg, Cr or Mn.

$Fe_2O_3$ particles are preferably $\gamma$-$Fe_2O_3$ particles, also known as maghemite.

The particles may also include ferrimagnetic particles of formula $MO.Fe_2O_3$, wherein M represents a metal amongst those hereinabove listed. They may be for example $CoFe_2O_4$ particles, as illustrated in the examples.

According to an advantageous embodiment, particles of at least one magnetic material are provided as a ferrofluid. According to the invention, "a ferrofluid" means ferromagnetic or ferrimagnetic material particles with a very small particle size, ranging from 0.001 µm to 0.3 µm, preferably from 0.003 µm to 0.2 µm and more preferably from 0.005 µm to 0.1 µm, which are essentially spherical or elongated in shape and which are suspended in an inert solvent, preferably an aqueous medium, for example deionized water. In some embodiments, a ferrofluid according to the invention consists in a particulate colloidal suspension of a ferrimagnetic material. In some embodiments, a ferrofluid according to the invention may be coated with a layer comprising one or more surfactant(s) in the suspended particle solution.

As used herein, a "dichroic dye" according to the invention means a dye that absorbs light, for a determined wavelength region, of one of the two polarization orthogonal components and which transmits the other polarization orthogonal component. A dichroic dye has the property of polarizing light in a linear manner. When exposed to a light source, for example a polychromatic light source, a dichroic dye does transmit at the absorption wavelength a light ray that is linearly polarized, characterized in that its vibration plane depends on the molecular orientation of such dye in the medium where it is contained.

Preferably, dichroic dye compounds comprised in a solid coating composition according to the invention are selected from the group consisting of 4-amino-3-((4'-((1-hydroxy-4-sulfo-2-naphthalenyl)azo)-3,3'-dimethoxy(1,1'-biphenyl)-4-yl)azo)-1-naphthalene sulfonic acid disodium salt, $C_{32}H_{30}N_5NaO_8S_2$ [Direct Violet 51], $C_{34}H_{28}N_6O_{16}S_4.4Na$ [Chicago Skye Blue 6B], $C_{22}H_{16}N_4O$-4-[4-(phenylazo)-1-naphthylazo]phenol [Disperse Orange 13], TCF® (Thin Crystal Film) from Optiva and dye Vari-Light® solution n°2P from Sterling.

A composition according to the invention is generally used for making a light-polarizing optical glass, and particularly for making a tinted optical glass, amongst which an optical sunglass. Thus, the type of dichroic dye, and the number of dichroic dyes, as comprised in a composition such as defined hereinabove, vary according to the targeted type of end use, that is to say according to the glass end colour that is looked for. It can be noted that the final tint of the polarizing optical glass being produced depends on the plurality of dyes present in the optical glass, that is to say dyes that are present in the polarizing solid coating layer, but also dyes that may have been incorporated into the substrate mass or dyes that may be present in one or more additional, functional coating layer(s), separate from the polarizing solid coating layer, as well.

Preferably, a solid coating composition according to the invention comprises at least two distinct dichroic dyes, and advantageously from two to six, more preferably from two to four distinct dichroic dyes.

The one or more surfactant(s) present in the solid coating composition according to the invention produce a statistical distribution substantially homogenous of the magnetic particles and of the dye(s), in the aqueous suspension global volume, when preparing such composition. When the composition is used as a film applied onto an optical glass substrate in a magnetic field, the one or more surfactant(s) enhance(s) the good alignment of the particles and of the dye(s) depending on the magnetic field direction, especially by reducing or by preventing in the suspension the formation of particulate aggregates. Such particulate aggregates must absolutely be avoided because such aggregates would necessarily comprise many particles that are non aligned according to the applied magnetic field direction what would dramatically reduce the light-polarizing properties of the final solid coating layer.

Moreover, such aggregates may be made able to scatter light. Light scattering induces an at least partial depolarization of the light and may thus lead to reduce or even neutralize the expected effect.

A surfactant used in a polarizing solid coating composition according to the invention may be any surfactant compound known or mixture thereof, preferably a surfactant compound that is transparent to the light and that does not induce any aggregation of the other compounds in the solution.

Advantageously, a surfactant compound used in a polarizing solid coating composition according to the invention is a non ionic type surfactant compound (i.e. fluorine, silicone or simply hydrocarbon type).

Preferably, a surfactant compound is selected from EFKA 3034 and nonylphenol ethoxylate (NPE).

Excellent results are obtained with the NPE as a surfactant.

The best light-polarizing properties for the final solid coating layer are provided with a composition such as defined hereinabove, wherein the weight ratio of the ferrimagnetic particles (solids)/dichroic dye(s) (solids) varies from 1:1 to 1:100, more preferably from 1:5 to 1:50, this dry matter weight ratio ranging preferably from 1:7 to 1:33.

The weight ratio is defined according to the magnetic nanoparticles as well as to the dyes used.

It preferably varies between a minimal ratio and a maximal ratio. The minimal ratio corresponds to the weight ratio below which there are not sufficiently nanomagnetic particles in the final solid film, causing thus the alignment of only part of the dichroic dyes that are present in the film, such an alignment being not optimal.

The maximal weight ratio corresponds to the weight ratio beyond which there are not sufficiently dichroic dyes in the final solid film. Even if all the dyes are aligned, they are not present in a sufficient amount and the film dichroic effect is not optimal.

Preferably, in a polarizing solid coating composition according to the invention, the amount of particles of at least one magnetic material varies from 0.1 to 1% by weight, preferably from 0.3 to 0.8% by weight.

Preferably, the particles of at least one magnetic material are spherical in shape. Anisotropic particles may also be used, especially needle- or cylinder-shaped particles.

The magnetic particles may be of the core/shell type, the core being made of a magnetic material and the shell made of an organic coating or an inorganic-organic hybrid coating.

The coating material may especially comprise an alkoxysilane-, preferably an epoxysilane-type material.

Preferably, the particles of at least one ferrimagnetic material have a mean particle size ranging from 0.001 µm to 0.3 µm, preferably from 0.003 µm to 0.2 µm and more preferably from 0.005 µm to 0.1 µm.

Typically, the amount of dichroic dye(s) in a polarizing solid coating composition according to the invention may vary to a very large extent depending on the final tint desired for the optical glass. However, dichroic dye(s) in an insufficient amount should be avoided because of its negative influence on the final, solid coating layer polarization properties.

According to another embodiment of the invention, the magnetic material particles may influence the dichroic dye orientation, not directly but via a compound acting as a relay. In such a case, such compound may present as a monomer, an oligomer or preferably a polymer which is oriented through the action of the magnetic particles. This is the case, especially, of a compound of the liquid crystal type in systems like guest-host systems such as described for example in the U.S. Pat. No. 6,245,399.

Advantageously, the amount of dichroic dye(s) varies from 1 to 10%, preferably from 4 to 6% by weight of the coating composition of the invention.

The amount of surfactant compound(s) in a solid coating composition according to the invention varies to a very large extent, depending on the compound type used and on surface active properties thereof.

However, the amount of surfactant compound(s) used may be easily determined by the one skilled in the art based on general knowledge, depending on the nature of the surfactant compound(s) used.

Advantageously, the amount of surfactant compound(s) comprised in a solid coating composition according to the invention does vary from 0.5 to 2% by weight relative to the composition total weight.

The solvent used for preparing the polarizing coating composition of the invention is preferably water, more preferably deionized water. Said aqueous solution may also comprise one or more colourless and water-miscible solvent(s), for example an alcohol, especially an alkanol such as ethanol, methanol, propanol or butanol.

The polarizing coating composition of the invention may also comprise an oligomer or a polymer binding agent, which is soluble in the above mentioned solvent and which is cured during or after the solvent evaporation.

This binding agent may also have reactive functions, especially (meth)acrylate functions, photoirradiation-activable, to crosslink the binding agent.

When the solvent is aqueous in nature, water-soluble binding agents such as polyvinyl alcohol (PVA), polymethacrylamides can be used.

The polarizing coating composition may comprise polymerizable monomers, that are preferably polymerizable under photoirradiation. In this case, the polarizing coating compositions comprise a photopolymerization initiator.

These polymerizable monomers may be used alone or in combination (admixture) with the above-mentioned binding agent.

It is a further object of the invention to provide a method for processing an optical glass, preferably an optical glass at least one face of which is covered with a light-polarizing solid coating layer, said method comprising the following steps:

a) forming onto the surface of an optical product that is either bare or covered with one or more functional coating layer(s), a liquid film of a polarizing solid coating composition comprising magnetic particles that are suspended in a solvent;

b) exposing said optical product covered with the composition liquid film, such as obtained at the end of step a), to the action of a magnetic field and c) performing the drying of said film, and, characterized in that at least one dichroic compound is present in said liquid film during step a) or applied onto the surface of said film after step c).

In step a), the liquid film is obtained by any method known per se, especially in the field of coating layers to be applied onto an optical substrate, as for example by dipping or spin-coating.

Preferably, the liquid film is obtained in step a), by depositing one or more drop(s) of the coating composition according to the invention, then by spin-coating, the film being formed under the action of the centrifugal force resulting from the rotation of the optical product substrate.

Advantageously, in step a), the speed of rotation varies from 500 to 1000 rpm, for an acceleration ranging from 300 to 5000 revolutions per minute and per second ("r/min/s"), said acceleration being typically of 5000 r/min/s.

The centrifugation time does preferably vary from 10 to 30 seconds.

In step b), the optical product that has been coated with a liquid composition film of a polarizing coating, is arranged in a magnetic field, the direction of the magnetic field being parallel to the surface of the substrate to be treated.

The drying of said film of step c) is preferably effected at least partly, simultaneously to the action of said magnetic field, and more preferably the action of said field is maintained for all the drying time.

Typically, the magnetic field is maintained for the time necessary to obtain the required polarization effect and thus may vary to a large extent.

A one-hour time is typically sufficient, but the liquid composition film may be exposed for 24 hours, for example.

When producing an ordinary polarized surface, that is to say that is uniform on its all surface, the magnetic field that is applied in step b) preferably has a constant orientation with a constant value during the entire step.

More preferably, a magnetic field is applied, the value of which does vary from 0.01 to 1 Tesla, such value being preferably of about 0.2 Tesla.

According to an interesting embodiment, the optical product to be treated is arranged in step b) of the method between poles of a permanent magnet.

The method of the invention has a very high flexibility so as to provide polarization modulation and/or polarization variation areas.

It can be envisaged for example to vary the polarization direction on the surface of an optical product onto which the polarizing film has been applied, or discontinued areas of differently oriented polarizations may also be envisaged.

To this aim, the optical product may be submitted to a spatially and/or temporally modulated magnetic field.

A further embodiment does consist in causing a more rapid drying of some areas in the liquid composition film, while preserving in this area the particle orientation within the magnetic material and the dichroic dyes.

Once the polarization of said areas has been fixed, the relative orientation of the optical product bearing the polarizing film and of the magnetic field applied may be changed, so as to provide the rest of the product with a different polarization.

This step may be repeated as many times as necessary, depending on the number of different polarization areas that are aimed at.

In a particular embodiment, the above method comprises an additional step d) consisting in fixing the light-polarizing solid coating layer.

Step d) is preferably carried out by dipping the polarizing optical glass obtained at the end of step c) in a fixing bath.

$BaCl_2$ is preferably used as a fixing agent.

Most preferably, fixing step d) is carried out in a $BaCl_2$ bath at a pH value ranging from 3 to 4, more preferably at a pH value of 3.5, for a period ranging from 5 seconds to 1 minute, more preferably from 10 seconds to 40 seconds, and even more preferably of about 20 seconds.

During step d), the fixing step as such was followed with at least one rinsing step, more preferably at least three rinsing steps in distilled water, followed by a drying, preferably a drying at room temperature, that can last for 3 to 30 minutes, more preferably for 15 minutes.

The fixing step makes it possible to complex the fixing agent with accessible chemical groups of the dichroic dye(s). In the case of $BaCl_2$, barium ions are complexed with the anionic chemical groups of the dichroic dye(s).

As already mentioned hereinabove, the method of the invention is equally apply whether with an optical substrate made of mineral glass or with an optical substrate made of organic glass.

According to another interesting characteristic, the above mentioned method may also comprise, prior to step a), an acidic or basic pre-treating step of the optical glass surface, more specifically in the embodiment wherein step a) is conducted with a bare optical glass, not comprising any previous coating layer.

This pre-treating step of the glass surface to be treated improves the adhesion conditions of the polarizing solid coating layer onto said surface.

For treating the surface of a mineral glass according to the method of the invention, a pre-treating step under acidic conditions will be preferably carried out, for example with an acetic acid-based aqueous solution at a concentration ranging from 2% to 8%, more preferably from 3% to 7%, even more preferably of 5% by weight. The acidic pre-treating step is usually conducted in a hot atmosphere at a temperature ranging from 40° C. to 60° C., the temperature being preferably of 48° C. The acidic pre-treating step is conventionally 30 minutes.

For treating the surface of an organic glass according to the method of the invention, a pre-treating step under basic conditions will be preferably carried out, for example with a soda-based aqueous solution at a concentration ranging from 2% to 8%, more preferably from 3% to 7%, even more preferably of 5% by weight. The basic pre-treating step is conventionally conducted in a hot atmosphere at a temperature ranging from 40° C. to 60° C., the temperature being preferably of 50° C. The basic pre-treating step is conventionally from 4 to 5 minutes and is preferably 4, 5 minutes long.

We did show that the polarizing coating layer according to the invention has excellent light-polarizing properties.

We did measure especially the ability of the coating layer according to the invention to polarize light, in accordance with ISO 8980-3 standard. We did thus measure the light transmission via the coating layer that was exposed to a visible light source, polarized linearly, successively parallel and perpendicular to the polarization plane of said coating layer. The light transmission measurements via the coating layer according to the invention were conducted with different successive wavelengths, ranging from 350 nm to 800 nm. These measurements made it possible to define for each wavelength, the contrast ratio, hereafter "CR" abbreviated, calculated according to the "parallel transmission"/"perpendicular transmission" ratio. A CR spectrum is obtained for the successive wavelengths, which defines the light-polarizing properties of the polarizing coating layer according to the invention. When using as dichroic dyes a combination of dyes marketed by Sterling, a CR value of about 20 is obtained. By using as dichroic dyes, the dye marketed by Optiva, a CR value of above 30 is obtained. Additionally, for a given polarizing coating composition according to the invention, the CR value is very similar, or even the same, whether the ophthalmic glass is a biplane glass or a corrective glass.

The polarizing solid coating layer may be applied directly onto the bare substrate or onto a substrate that has been already coated with one or more additional, functional layer(s). These additional, functional layers may further be applied onto the polarizing coating layer according to the invention.

According to a first particular embodiment, the polarizing solid coating layer according to the invention is applied directly onto the bare glass.

According to a second particular embodiment, the polarizing solid coating layer according to the invention is applied onto an optical glass the surface of which has been already coated with one or more functional coating layer(s), amongst the functional coating layers that are conventionally used in the optics field.

According to a third embodiment, in the final product optical glass, the polarizing solid coating layer according to the invention, which is applied equally onto a bare glass or a glass already coated with one or more functional coating layer(s), is coated with one or more additional, functional coating layer(s).

Thus, according to a further advantageous characteristic, the above mentioned method may also comprise, after step c), or after step b) when step c) is omitted, one or more additional coating step(s) of the polarizing solid coating layer with one or more additional coating layer(s).

The functional coating layer(s), that constitute(s) the end product optical glass, is or are typically selected from coating layers traditionally used in the optics field such as an anti-reflective coating layer, a wear-resistant coating layer, an impact-resistant coating layer, a photochromic coating layer, an opto-electronic coating layer, an electro-photochromic coating layer, a tinted coating layer or a coating layer with a printed pattern such as a logo. The hereinabove coating layer(s) is or are used in the form of a layer stack in which the polarizing coating layer of the invention is incorporated.

Such a layer stack of coating layers is for example a layer stack consisting in stacking successive coating layers as follows:
- a light-polarizing coating layer, according to the invention;
- optionally, an impact-resistant layer, preferably a polyurethane latex or an acrylic latex (such an impact-resistant layer, especially when using polyurethane latex, will be preferably applied prior to depositing the light-polarizing solid coating composition according to the invention);
- a wear-resistant coating layer or a hard coating, that does preferably comprise a hydrolysate of one or more epoxysilane(s) and one or more mineral fillers such as colloidal silica;
- one or more antireflective layer(s), typically comprising a mineral material such as a metal oxide or silica;
- optionally, a hydrophobic anti-smudge layer, or a "top coat"; each layer of the hereinabove layer stack being deposited according to ordinary methods that are well known to the one skilled in the art.

Typically, the overall thickness of such layer stack comprising various alternate anti-reflective coatings (AR), amongst those previously mentioned, varies from 80 nm to 800 nm.

The thickness of the wear-resistant layer preferably varies from 1 to 10 micrometers, more preferably from 2 to 6 micrometers.

The thickness of the impact-resistant primer layer does preferably vary from 0.5 to 3 micrometers.

It is a further object of the present invention to provide a light-polarizing optical glass, at least one of the surfaces of which is coated with a layer of a light-polarizing solid coating comprising the combination made of (i) particles of a magnetic material and (ii) a dichroic dye compound.

Said optical glass is preferably obtained according to the method such as previously defined in the present description.

According to a further characteristic, the light-polarizing coating layer is obtained from a light-polarizing solid coating composition, such as defined hereinabove in the present description.

The optical glass according to the invention is preferably an ophthalmic lens, preferably a spectacle lens.

The optical glass surface which is coated with a polarizing coating layer according to the invention is preferably the surface opposed to the surface facing the eye side.

The optical glass preferably comprises at least one further functional coating layer, selected from the hereinabove described functional coating layers, said further functional coating layer being stacked equally whether above or under the light-polarizing coating layer.

Preferably, the further functional coating layer(s) is or are stacked above the light-polarizing coating layer according to the invention.

In the embodiment where only one further coating layer covers the polarizing coating layer according to the invention, said other coating layer is preferably selected from an antireflective layer or a wear-resistant coating layer.

It is a benefit of the present invention to allow to provide a strong polarizing effect for layers with a low thickness (i.e. that are typically about 2 microns thick or less, when the polarizing coating layer is free from any binding agent). The contrast ratio may be adjusted by rising the thickness of the layer.

The present invention will be subsequently illustrated without limitation with reference to the following examples and the appended figures.

FIGURES

Figure 3:
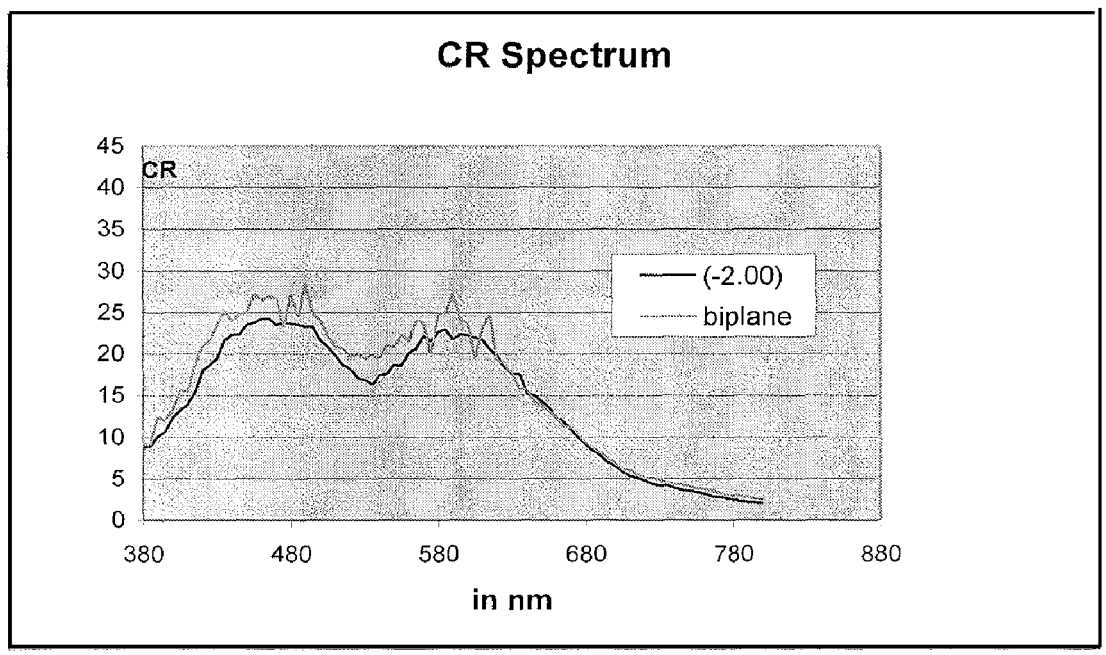

FIG. 3 shows the contrast ratio value (CR) spectrum, ranging from 350 nm to 800 nm, for a polarizing coating layer according to the invention comprising particles of a magnetic material (Ferrofluid MT25-31 marketed by Berlin Heart) and from a dichroic dye combination (Vari-Light marketed by Sterling). On the abscissa axis, the wavelengths given in nanometers; on the ordinate axis, the CR ratio values.

Figure 4:
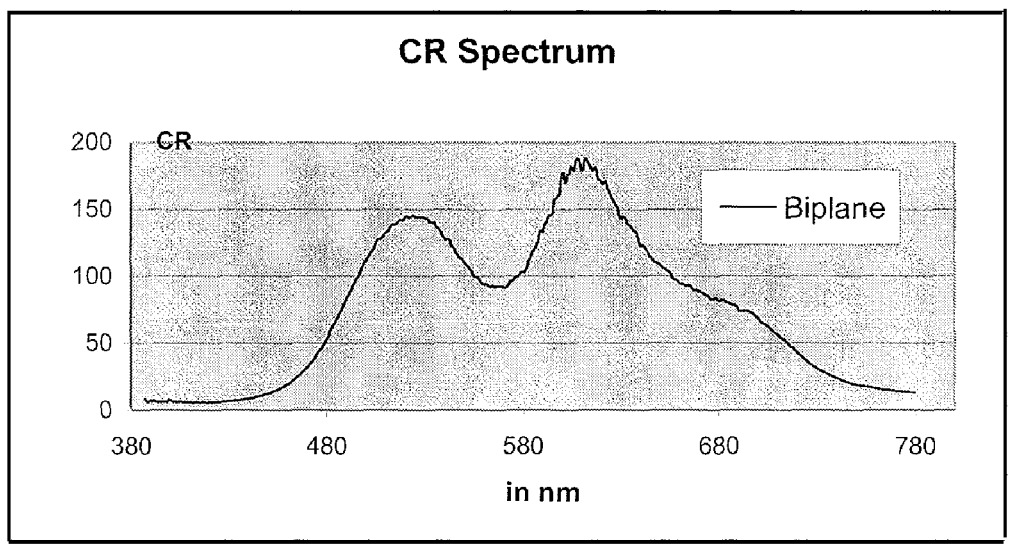

FIG. 4 shows the contrast ratio value (CR) spectrum, ranging from 350 nm to 800 nm, for a polarizing coating layer according to the invention comprising particles of a magnetic material (Ferrofluid MT25-31 marketed by Berlin Heart) and from a dichroic dye combination (TCF marketed by Optiva). On the abscissa axis, wavelengths given in nanometers; on the ordinate axis, CR ratio values.

Figure 5:
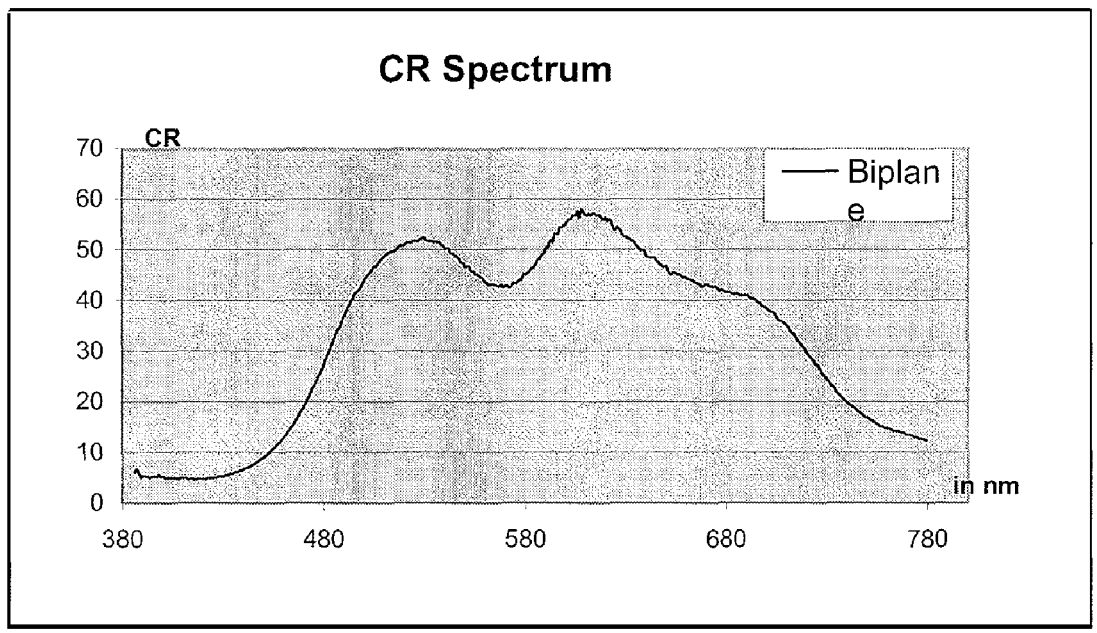

FIG. 5 shows the contrast ratio value (CR) spectrum, ranging from 350 nm to 800 nm, for a polarizing coating layer according to the invention comprising particles of a magnetic material (Ferrofluid EMG 805 marketed by Ferrotec) and from a dichroic dye combination (TCF marketed by Optiva). On the abscissa axis, wavelengths given in nanometers; on the ordinate axis, CR ratio values.

Figure 6:
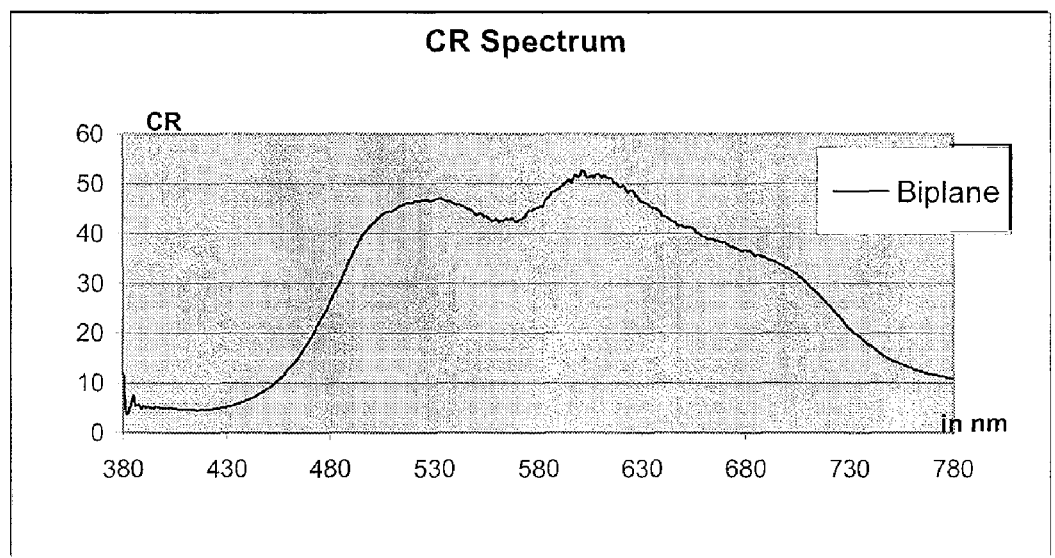

FIG. 6 shows the contrast ratio value (CR) spectrum, ranging from 350 nm to 800 nm, for a polarizing coating layer according to the invention comprising particles of a magnetic material (Ferrofluid EMG 1111 marketed by Ferrotec) and from a dichroic dye combination (TCF marketed by Optiva). On the abscissa axis, wavelengths given in nanometers; on the ordinate axis, CR ratio values.

EXAMPLES

In the examples, unless otherwise mentioned, all percentages and parts are by weight.

Example 1

Coating Layer Comprising Ferrimagnetic Particles, without any Dichroic Dye (Comparative Example)

An aqueous suspension comprising a cobalt ferrite-based ferrofluid (MT-2531 marketed by Berlin Heart) was deposited by "spin coating" onto a substrate in a mineral biplane glass.

Once deposited, the film was dried for 24 hours at room temperature between the poles of a permanent magnet (air gap 70 mm, magnetic field of 0.15 Tesla), so as to obtain a solid coating layer.

Figure 1:
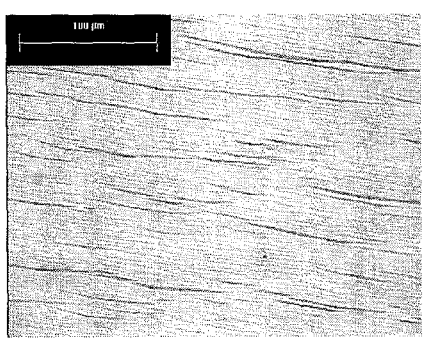
FIG. 1 shows for a coating comprising magnetic particles (Ferrofluid MT25-31 marketed by Berlin Heart) without any dichroic dye, microscopy pictures showing the polarized light source transmission, respectively parallel to the expected polarization plane (FIG. 1A) and perpendicular to the expected polarization plane (FIG. 1B).
Figure 1:
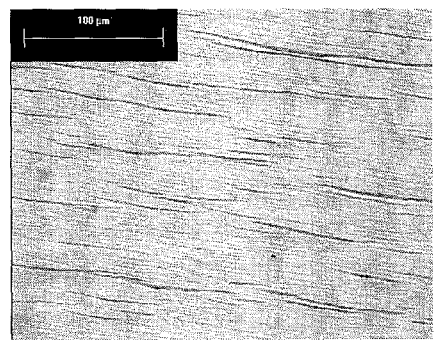

The polarization properties have been examined by using a microscope provided with a polarizing filter and by linearly orientating the polarized light, respectively parallel to and vertically to the expected polarization plane of the coating layer. The results are presented in FIG. 1.

The results show a total transmission of the light polarized via the coating layer, whether it was polarized linearly parallel to (FIG. 1A) or vertically (FIG. 1B) to the expected polarization plane of said coating layer.

These results clearly indicate that ferrimagnetic particles, when incorporated into a solid coating layer, do not polarize the light.

Example 2

Polarizing Coating Layer According to the Invention Comprising a Dichroic Dye Combination [Vari-Light Marketed by Sterling]

A composition was prepared for a polarizing solid coating layer according to the invention by making a mixture consisting of 0.132 g of a ferrofluid (MT25-31, marketed by Berlin Heart), 6.6 g of a dichroic dye combination (Vari-Light, marketed by STERLING), and 0.022 g of a surfactant (nonylphenol ethoxylate or NPE, marketed by Sterling Optics).

The ferrofluid (solids)/dye (solids) weight ratio in the solid coating layer composition is 1:7.5. The weight percentage of solids (except surfactant) in the solid coating layer was as follows:

Dye: 88.2%;
Ferrofluid: 11.8%.

Then the surface of two organic glasses was pre-treated, respectively a biplane glass and a "−2.00 dioptres" corrective glass, of the Stigmal type marketed by Essilor International under acidic conditions, with two overall 30 minute-long runs in the following solutions:

Basic solution at 48° C.;
5% acetic acid+0.5% non ionic surfactants and toluene sulfonic acid at 48° C.;
Osmosed water at 40° C.

The hereinabove coating layer composition was deposited by spin-coating onto each of both pre-treated glass substrates, at a rate of 500 rpm, an acceleration of 5000 rpm/sec, for a 30 sec time period.

Then, the glasses, one surface of which had been coated with a liquid film of the polarizing coating layer composition, were arranged between both poles of a permanent magnet (air gap of 70 mm) applying a magnetic field of 0.15 Tesla whose orientation is parallel to the surface of the product to be treated and underwent a drying step, for 24 hours at room temperature.

The polarization properties were examined, by using a microscope provided with a polarizing filter and by linearly orientating the polarized light, respectively parallel to and vertically to the expected polarization plane of the coating layer.

Figure 2:
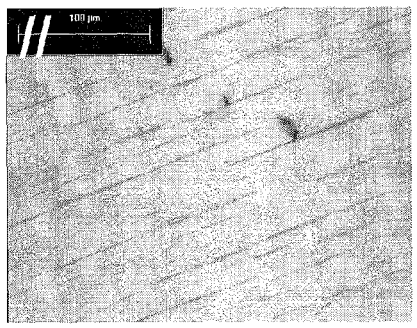
FIG. 2 shows, for a coating comprising magnetic particles (Ferrofluid MT25-31 marketed by Berlin Heart) and a dichroic dye combination (Vari-Light marketed by Sterling Optics), microscopy pictures showing the polarized light source transmission, respectively parallel to the expected polarization plane (FIG. 2A) and perpendicular to the expected polarization plane (FIG. 2B).
Figure 2:

A light quenching was observed, due to the polarizing solid coating layer of the invention, when the light was polarized perpendicular to the expected polarization plane, for the biplane glass and for the "−2.00 dioptres" corrective glass, as illustrated in FIG. 2.

The CR spectrum was more particularly determined for each of both glasses by means of measurements conducted in accordance with the ISO 8980-3 standard.

Table 1 hereafter gives the CR measurement results which are also illustrated within the overall wavelength spectrum ranging from 350 nm to 800 nm in FIG. 3.

TABLE 1

CR ratio measurement

| Sample | Parallel Transmission (%) | Perpendicular Transmission (%) | CR |
|---|---|---|---|
| glass (−2.00 dioptres) | 50.89 | 2.62 | 19.4 |
| Biplane glass | 52.10 | 2.45 | 21.2 |

The results show that the solid coating layer according to the invention does possess excellent light-polarizing properties, within a broad wavelength range.

Example 3

Polarizing Coating Layer According to the Invention Comprising a Dichroic Dye Combination Marketed by Optiva A composition was prepared for a polarizing solid coating layer according to the invention by making a mixture consisting of 0.61 g of a ferrofluid (MT25-31, marketed by Berlin Heart), 15.65 g of the TCF dichroic dye combination (Thin Crystal Film) marketed by Optiva, and 0.182 g of a surfactant (nonylphenol ethoxylate or NPE, marketed by Sterling Optics Inc.) and 15.67 g of distilled water.

The ferrofluid (solids)/dye (solids) weight ratio is 1:7.5. The weight percentage of solids (except surfactant) in the dry matter of the coating composition was as follows:

Dye: 88.2%;
Ferrofluid: 11.8%.

The surface of biplane glasses of the Orma® type marketed by Essilor International was then treated under basic conditions, with one 4.5 minute-long run in the following basic solution:

5% soda at 50° C.;
Followed by rinsing in aqueous solutions.

The hereinabove coating layer composition was deposited by spin-coating onto each of both pre-treated glass substrates, at a rate of 500 r/min, an acceleration of 5000 rpm/sec, for a time period of 10 sec.

Glasses, one surface of which had been coated with a liquid film of the polarizing coating layer composition, were then arranged between both poles of a permanent magnet (air gap of 70 mm and magnetic field of 0.15 Tesla) which field orientation was parallel and underwent a drying step, for 24 hours at room temperature, under said magnetic field.

The polarizing coating layer is 1.10 μm thick.

A light quenching was observed, due to the polarizing solid coating layer of the invention when light was polarized perpendicular to the expected polarization plane for the biplane glasses.

More particularly, the CR spectrum for each of both glasses was determined with measurements effected in accordance with the ISO 89803 standard.

Table 2 hereunder gives CR measurement results, that are further illustrated within the overall wavelength spectrum ranging from 350 nm to 800 nm in FIG. 4.

TABLE 2

CR ratio measurement

| Sample | Parallel Transmission (%) | Perpendicular Transmission (%) | CR |
|---|---|---|---|
| Biplane glass | 68.19 | 0.66 | 103 |

The results also show that the solid coating layer according to the invention possesses excellent light-polarizing properties, within a broad wavelength range.

Example 4

Ferrofluid EMG 805/Optiva Dyes

A composition was prepared for a polarizing solid coating layer according to the invention by making a mixture consisting of 0.13 g of ferrofluid (EMG 805, marketed by Ferrotec), 3.40 g of the TCF dichroic dye combination (Thin Crystal Film) marketed by Optiva, and 0.037 g of a surfactant (nonylphenol ethoxylate or NPE, marketed by Sterling Optics Inc.) and 3.41 g of distilled water.

The ferrofluid (solids)/dye (solids) weight ratio is 1:32. The weight percentage of solids (except surfactant) in the coating composition dry matter was as follows:
Dye: 97%;
Ferrofluid: 3%.

The surface of biplane glasses of the Orma® type marketed by Essilor International was then treated under basic conditions, with one 4.5 minute-long run in the following basic solution:
5% soda at 50° C.;
Followed by rinsing in aqueous solutions.

The hereinabove coating layer composition was deposited by spin-coating onto each of both pre-treated glass substrates, at a rate of 500 r/min and an acceleration of 5000 rpm/sec for a time period of 10 sec.

Glasses, one surface of which had been coated with a liquid film of the polarizing coating layer composition, were then arranged between both poles of a permanent magnet (air gap of 70 mm and magnetic field of 0.15 Tesla) which field orientation was parallel and underwent a drying step, for 24 hours at room temperature, under said magnetic field.

The polarizing coating layer was 0.89 μm thick.

A light quenching was observed, due to the polarizing solid coating layer of the invention, when light was polarized perpendicular to the expected polarization plane for the biplane glasses.

More particularly, the CR spectrum for each of both glasses was determined with measurements effected in accordance with the ISO 89803 standard.

Table 3 below gives CR measurement results, that are further illustrated within the overall wavelength spectrum ranging from 350 nm to 800 nm in FIG. 5.

TABLE 3

CR ratio measurement

| Sample | Parallel Transmission (%) | Perpendicular Transmission (%) | CR |
|---|---|---|---|
| Biplane glass | 70.42 | 1.59 | 44 |

The results show that the solid coating layer according to the invention possesses excellent light-polarizing properties, within a broad wavelength range.

Example 5

Ferrofluid EMG 1111/Optiva Dyes

A composition was prepared for a polarizing solid coating layer according to the invention by making a mixture consisting of 0.21 g of ferrofluid (EMG 1111, marketed by Ferrotec), 5.22 g of the TCF dichroic dye combination (Thin Crystal Film) marketed by Optiva, and 0.060 g of a surfactant (nonylphenol ethoxylate or NPE, marketed by Sterling Optics Inc.) and 5.22 g of distilled water.

The ferrofluid (solids)/dye (solids) weight ratio is 1:12. The weight percentage of solids (except surfactant) in the coating composition dry matter was as follows:
Dye: 92.5%;
Ferrofluid: 7.5%.

The surface of biplane glasses of the Orma® type marketed by Essilor International was then treated under basic conditions, with a 4.5 minute-long run in the following acidic solution:
5% soda at 50° C.;
Cleaning with water.

The hereinabove coating layer composition was deposited by spin-coating onto each of both pre-treated glass substrates, at a rate of 500 r/min, an acceleration of 5000 rpm/sec, for a time period of 10 sec.

Glasses, one surface of which had been coated with a liquid film of the polarizing coating layer composition were then arranged between both poles of a permanent magnet (air gap of 70 mm and magnetic field of 0.15 Tesla) which field orientation was parallel and underwent a drying step, for 24 hours at room temperature, under said magnetic field.

The polarizing coating layer was 0.72 μm thick.

A light quenching was observed, due to the polarizing solid coating layer of the invention, when light was polarized perpendicular to the expected polarization plane for the biplane glasses.

More particularly, the CR spectrum for each of both glasses was determined with measurements effected in accordance with the ISO 89803 standard.

Table 4 above gives CR measurement results, which are further illustrated within the overall wavelength spectrum ranging from 350 nm to 800 nm in FIG. 6.

TABLE 4

CR ratio measurement

| Sample | Parallel Transmission (%) | Perpendicular Transmission (%) | CR |
|---|---|---|---|
| Biplane glass | 73.11 | 1.75 | 42 |

The results show that the solid coating layer according to the invention possesses excellent light-polarizing properties, within a broad wavelength range.

Example 6

Polarizing Coating Layer According to the Invention Comprising a Dichroic Dye Combination Marketed by Optiva and a Binding Agent A composition was prepared for a polarizing solid coating layer according to the invention by making a mixture consisting of a ferrofluid (MT25-31, marketed by Berlin Heart), of the TCF dichroic dye combination (Thin Crystal Film) marketed by Optiva, of a surfactant (nonylphenol ethoxylate or NPE, marketed by Sterling Optics Inc.), of a polymer PVA binding agent (polyvinyl alcohol) and of distilled water by performing as follows:

4 g of PVA+40 g of distilled water were introduced into a glass vial. The mixture was heated to 80° C. for 3 hours so as to completely dissolve PVA in water.

A mixture was prepared by adding 10 g of a PVA/water solution, 0.096 g of MT25-31, 2.38 g of Optiva TCF dye and 0.066 g of NPE.

The surface of biplane glasses of the Orma® type marketed by Essilor International was then pre-treated by dipping into a 5% soda bath at 50° C., then by rinsing in water baths.

The hereinabove coating layer composition was deposited by spin-coating onto the pre-treated substrate, at a rate of 500 r/min, an acceleration of 5000 rpm/sec, for a time period of 10 sec.

Once the solution had been deposited, the glass one surface of which had been coated with a liquid film of the polarizing coating layer composition was arranged in the permanent magnet, under the conditions of example 2 and dried for 24 hours in the magnet at room temperature.

The results obtained with the procedure of example 2 are listed in Table 5 hereunder.

TABLE 5

| | CR ratio measurement | | |
|---|---|---|---|
| Sample | Parallel Transmission (%) | Perpendicular Transmission (%) | CR |
| Biplane glass | 45.61 | 9.23 | 4.94 |

CR = Transmission$_{parallel}$/Transmission$_{perpendicular}$

A polarizing effect was observed.

Example 7

Polarizing Coating Layer According to the Invention Comprising a Dichroic Dye Combination Marketed by Optiva In this example, a composition was prepared for a polarizing solid coating layer according to the invention by depositing said layer onto an initial PVA/ferrofluid layer, that had been previously submitted to a magnetic field.

A mixture was prepared, comprising a ferrofluid (MT25-31, marketed by Berlin Heart), PVA and water, by performing as follows:

4 g of PVA+40 g of distilled water were introduced into a glass vial. The mixture was heated to 80° C. for 3 hours so as to completely dissolve PVA in water, than the PVA solution was allowed to cool for about 30 minutes.

A mixture was made by adding 15.03 g of a PVA/water solution to 0.0157 g of MT25-31.

The surface of an Orma® organic glass marketed by Essilor International (power −2.00 dioptres) was then pre-treated by dipping into a 5% soda bath at 50° C., then by rinsing in water bathes.

The hereinabove coating layer composition was deposited by spin-coating onto the pre-treated substrate, at a rate of 500 r/min, an acceleration of 5000 rpm/sec, for a time period of 10 sec.

Once the solution had been deposited, the glass was arranged in the permanent magnet, under the conditions of example 2 and dried for 24 hours in the magnet at room temperature and a PVA/ferrofluid solid layer was then obtained.

A dye solution was then prepared by mixing 4 g of Optiva TCF dyes with 4 g of distilled water and 0.048 g of NPE.

This solution was then deposited by spin coating onto the PVA/ferrofluid solid layer at a rate of 1000 r/min, an acceleration of 5000 rpm/sec, for a time period of 10 sec.

The glass was then dried for 24 hours at room temperature.

The polarization properties of the end glass obtained in the same way as in example 2 were measured.

The results are given in Table 6 above.

TABLE 6

| | CR ratio measurement | | |
|---|---|---|---|
| Sample | Parallel Transmission (%) | Perpendicular Transmission (%) | CR |
| −2.00 dioptre corrective glass | 64.43 | 1.52 | 42.4 |

CR = Transmission$_{parallel}$/Transmission$_{perpendicular}$.

The invention claimed is:

1. A light-polarizing solid coating composition comprising: particles of at least one magnetic material and at least one dichroic dye compound, suspended in a solvent.

2. The composition of claim 1, wherein the solvent is an aqueous solution.

3. The composition of claim 1, further comprising at least one surfactant.

4. The composition of claim 3, wherein the surfactant compound(s) represent(s) from 0.5 to 2% by weight relative to the composition total weight.

5. The composition of claim 1, wherein the magnetic material is a ferromagnetic material or a ferrimagnetic material.

6. The composition of claim 1, wherein the ferrimagnetic material particles are particles of $Fe_2O_3$ or of formula $MO.Fe_2O_3$, wherein M is Zn, Cd, Fe, Ni, Cu, Co, Mg, Cr, or Mn.

7. The composition of claim 1, wherein the weight ratio in dry matter of magnetic particles to dichroic dye(s) is from 1:5 to 1:50.

8. The composition of claim 7, wherein the weight ratio in dry matter of magnetic particles to dichroic dye(s) is from 1:7 to 1:33.

9. The composition of claim 1, wherein the amount of particles of at least one magnetic material is from 0.1 to 1% relative to the weight of the composition.

10. The composition of claim 1, wherein the particles of at least one magnetic material are spherical particles.

11. The composition of claim 1, wherein the particles of at least one magnetic material have a mean particle size from 0.001 μm to 0.3 μm.

12. The composition of claim 11, wherein the particles of at least one magnetic material have a mean particle size from 0.005 μm to 0.1 μm.

13. The composition of claim 1, wherein the dichroic dye amount is from 1 to 10% by weight of the composition.

14. The composition of claim 1, further defined as comprising at least one oligomer or polymer binding agent.

15. The composition of claim 11, wherein the binding agent is a polyvinyl alcohol.

16. The composition of claim 1, further defined as comprising a relay compound in a monomer, oligomer, or polymer form to cause the dichroic dye orientation.

17. The composition of claim 16, wherein the relay compound is a liquid crystal.

18. A method for processing an optical product comprising at least one face covered with a light-polarizing solid coating layer, said method comprising:
   a) applying a liquid film of a polarizing solid coating composition comprising magnetic particles that are suspended in a solvent onto the surface of an optical product that is either bare or covered with one or more functional coating layer(s);
   b) exposing said optical product covered with the composition liquid film, resulting from step a), to the action of a magnetic field, and
   c) performing the drying of said film,
   wherein at least one dichroic dye compound is present in said liquid film during step a) or applied onto the surface of said film after step c).

19. The method of claim 18, wherein at least one dichroic dye compound is present in said film during step a).

20. The method of claim 18, wherein the drying of said film of step c) is effected at least partly simultaneously to the action of said magnetic field.

21. The method of claim 18, further comprising an additional d) step for fixing the light-polarizing solid coating layer.

22. The method of claim 18, further comprising prior to step a) an acidic or a basic pre-treating step for the optical product surface.

23. The method claim 18, further comprising after step c) one or more additional step(s) for coating the polarizing solid coating layer with one or more additional coating layer(s).

24. A light-polarizing optical product, at least one of the surfaces of which is coated with a light-polarizing solid coating layer comprising the combination made of (i) particles of a magnetic material and (ii) a dichroic dye compound.

25. The light-polarizing optical product of claim 24, wherein the polarizing solid coating layer is obtained from a composition comprising particles of at least one magnetic material and at least one dichroic dye compound, suspended in a solvent.

26. The light-polarizing solid coating composition of claim 1, wherein the composition is comprised on an optical glass.

27. The light-polarizing solid coating composition of claim 26, wherein the optical glass is an ophthalmic lens.

* * * * *

UNITED STATES PATENT AND TRADEMARK OFFICE
CERTIFICATE OF CORRECTION

| | | |
|---|---|---|
| PATENT NO. | : 8,062,542 B2 | Page 1 of 1 |
| APPLICATION NO. | : 11/576670 | |
| DATED | : November 22, 2011 | |
| INVENTOR(S) | : John Biteau et al. | |

It is certified that error appears in the above-identified patent and that said Letters Patent is hereby corrected as shown below:

In claim 15, column 16, line 66, delete "claim 11" and insert --claim 14-- therefor.

Signed and Sealed this
Twenty-seventh Day of March, 2012

David J. Kappos
*Director of the United States Patent and Trademark Office*